(12) United States Patent
Fish

(10) Patent No.: US 11,745,446 B2
(45) Date of Patent: Sep. 5, 2023

(54) METHOD FOR MANUFACTURING A WIND TURBINE BLADE AND AN APPARATUS FOR MANUFACTURING A WIND TURBINE BLADE

(71) Applicant: BLADE DYNAMICS LIMITED, Eastleigh (GB)

(72) Inventor: Harry Fish, Eastleigh (GB)

(73) Assignee: BLADE DYNAMICS LIMITED, Eastleigh (GB)

( * ) Notice: Subject to any disclaimer, the term of this patent is extended or adjusted under 35 U.S.C. 154(b) by 0 days.

(21) Appl. No.: 17/783,991

(22) PCT Filed: Dec. 10, 2020

(86) PCT No.: PCT/EP2020/085498
§ 371 (c)(1),
(2) Date: Jun. 9, 2022

(87) PCT Pub. No.: WO2021/116278
PCT Pub. Date: Jun. 17, 2021

(65) Prior Publication Data
US 2023/0025179 A1 Jan. 26, 2023

(30) Foreign Application Priority Data

Dec. 10, 2019 (GB) ...................................... 1918080

(51) Int. Cl.
*B29C 70/54* (2006.01)
*B29C 70/30* (2006.01)
(Continued)

(52) U.S. Cl.
CPC ............ *B29C 70/543* (2013.01); *B29C 70/30* (2013.01); *B29K 2307/04* (2013.01); *B29K 2309/08* (2013.01); *B29L 2031/085* (2013.01)

(58) Field of Classification Search
None
See application file for complete search history.

(56) References Cited

U.S. PATENT DOCUMENTS 5,265,712 A   11/1993   Krieg

FOREIGN PATENT DOCUMENTS

DE   102017121892 B4   3/2019
EP        1767477 A1   3/2007
(Continued)

*Primary Examiner* — Barbara J Musser
(74) *Attorney, Agent, or Firm* — Nath, Goldberg & Meyer; Jerald L. Meyer; Tanya E. Harkins

(57) ABSTRACT

A method for manufacturing a wind turbine blade includes the use of an apparatus having an engagement part. The engagement part has: a support element having a first support edge and a second support edge, a belt extending around the support element and forming a primary engagement edge of the engagement part along the first support edge of the support element. The method includes: providing one or more pre-shaped elements, including a first pre-shaped element, in a first element position, positioning the engagement part in a first position, moving the support element in a first direction with a first velocity to extend underneath the first pre-shaped element, and at the same time moving the belt relative to the support element around the first support edge in a primary direction from below the first support edge to above the first support edge with a primary velocity.

15 Claims, 9 Drawing Sheets

(51) Int. Cl.
   *B29K 307/04*    (2006.01)
   *B29K 309/08*    (2006.01)
   *B29L 31/08*     (2006.01)

(56) References Cited

FOREIGN PATENT DOCUMENTS

EP      2551222 A1      1/2013
   EP      2808158 A1     12/2014
   JP      2002167045 A    6/2002
   JP      3550541 B2 *    8/2004
   WO      2006088354 A1   8/2006

* cited by examiner

METHOD FOR MANUFACTURING A WIND TURBINE BLADE AND AN APPARATUS FOR MANUFACTURING A WIND TURBINE BLADE

This is a National Phase Application filed under 35 U.S.C. 371 as a national stage of PCT/EP2020/085498, filed Dec. 10, 2020, an application claiming the benefit of European Patent Application No. 1918080.1, filed Dec. 10, 2019, the content of each of which is hereby incorporated by reference in its entirety.

The present disclosure relates to wind turbine blades and manufacture of wind turbine blades. More specifically, the present disclosure pertains to the field of manufacturing parts of a wind turbine blade, such as reinforcement parts of blade shells, such as blade shell parts, shear webs, spar beams, spar caps etc.

BACKGROUND

Wind turbine blades of fibre-reinforced polymer and in particular the aerodynamic shells of wind turbine blades are usually manufactured in moulds, where the pressure side and the suction side of the blade are manufactured separately by arranging glass fibre mats and/or other fibre-reinforcement material, such as carbon fibre, in each of the two moulds. Afterwards, one of the two halves is turned upside down and positioned on top of the other of the two halves, and the two halves are adhered together. The blade parts may be positioned on top of each other by turning and repositioning the complete half mould.

A wind turbine blade and/or components of the wind turbine blade, such as webs and/or shells, may be manufactured by infusing fibres, such as glass fibre mats and/or carbon fibre mats with a resin, such as polyester or epoxy. Infusion of the fibres may be provided by vacuum assisted resin transfer moulding (VARTM).

As wind turbines and wind turbine blades increase in size, the blade loads, i.e. strains, bending moments, peel loads etc., increase. For this and other reasons, precision in placement of component is of an increasing importance. Furthermore, elements made of fibre materials, such as dry fabric or pultruded elements, must be handled with care when transferred in order not to deform the element.

There is a desire to improve the process of manufacturing parts for a wind turbine blade and to reduce the total manufacturing time for a wind turbine blade. More specifically, it is a desire to reduce the in-mould manufacturing time for wind turbine blades to provide a faster turnaround time. By manufacturing as many elements offline, i.e. out of the blade mould, and laying the pre-shaped elements in the mould, the in-mould manufacturing time can be reduced.

Furthermore, a more precise, automated and easier way of laying up the pre-shaped elements may also reduce the total manufacturing time, improve the quality of the wind turbine blades and reduce manual labour.

SUMMARY OF THE INVENTION

It is an object of the present disclosure to provide a method for manufacturing a wind turbine blade and an apparatus for manufacturing a wind turbine blade, which overcomes at least some of the disadvantages of the prior art.

In particular, it is an object of the present invention to provide a method for manufacturing a wind turbine blade and an apparatus for manufacturing a wind turbine blade, which improves the process of positioning of components as well as facilitating decreased manufacturing time. Improvement in the process of positioning elements may further decrease manufacturing variations and enhance mechanical properties of the assembled blade.

Thus, the present invention relates to a method for manufacturing, such as for manufacturing a wind turbine blade and/or at least a part of a wind turbine blade. The method comprises the use of an apparatus comprising an engagement part. The engagement part comprises a support element having a first support edge and optionally a second support edge. The engagement part comprises a belt extending around the support element and forming a primary engagement edge of the engagement part along the first support edge of the support element. The method comprises providing one or more pre-shaped elements, including a first pre-shaped element, in a first element position. The method comprises positioning the engagement part in a first position. The method comprises moving the support element in a first direction with a first velocity to extend underneath the first pre-shaped element. While moving the support element in a first direction with a first velocity, the method comprises moving the belt relative to the support element around the first support edge in a primary direction from below the first support edge to above the first support edge with a primary velocity, wherein the first velocity and the primary velocity are the same. The method comprises positioning the engagement part in a second position. The method comprises releasing the pre-shaped element, e.g. from being supported by the belt.

According to a preferred embodiment the engagement part in the second position is arranged above a blade shell part. Furthermore, the pre-shaped element may be released onto the blade shell part, e.g. when the engagement part is in the second position.

Also disclosed is an apparatus for manufacturing, such as for manufacturing a wind turbine blade and/or at least a part of a wind turbine blade. The apparatus comprises an engagement part. The engagement part comprises a support element having a first support edge and optionally a second support edge. The engagement part comprises a belt extending around the support element and forming a primary engagement edge of the engagement part along the first support edge of the support element. The apparatus is configured to position the engagement part in a first position to collect a first pre-shaped element of one or more pre-shaped elements. The apparatus is configured to move the support element in a first direction with a first velocity to extend underneath the first pre-shaped element. The apparatus is configured to move the belt relative to the support element around the first support edge in a primary direction from below the first support edge to above the first support edge with a primary velocity while the support element is moved in the first direction with the first velocity, wherein the first velocity and the primary velocity are the same. The apparatus is configured to position the engagement part in a second position and release the pre-shaped element, e.g. from being supported by the belt.

It is an advantage of the present disclosure that an easier and more accurate way of laying up pre-shaped elements in a blade shell part may be provided, as the apparatus provides a more automated way of controlling the position of the elements. Furthermore, the present invention provides for a safer environment for employees and reduces need for manual physical labour of employees during laying up.

It is a further advantage of the present disclosure that the apparatus may allow for pre-shaped elements to be picked up and dropped off with reduced deformation of the element.

It is an even further advantage of the present disclosure that it facilitates layers of a pre-shaped element being laid up outside the blade shell mould, since the disclosed apparatus facilitates an improved method of transferring pre-shaped elements, thus reducing the total manufacturing time.

The pre-shaped element may be pre-assembled dry sheets, which have been consolidated or part consolidated. Alternatively, the pre-shaped element may be pultruded elements.

The pre-shaped element may be released, e.g. from being supported by the belt, by moving the support element in a second direction, e.g. opposite the first direction, with a second velocity. While moving the support element in the second direction with the second velocity, the belt may be moved relative to the support element around the first support edge in a secondary direction, e.g. opposite the primary direction, from above the first support edge to below the first support edge with a secondary velocity. The second velocity and the secondary velocity may be the same, such that the pre-shaped element can be released with little or no structural disturbance to the pre-shaped element. Alternatively, the pre-shaped element may be released over the second support edge, e.g. by moving the support element in a third direction, e.g. parallel to the first direction, with a third velocity. While moving the support element in the third direction with the third velocity, the belt may be moved relative to the support element around the second support edge in a tertiary direction, e.g. the same as the primary direction, from above the second support edge to below the second support edge with a tertiary velocity. The third velocity and the tertiary velocity may be the same, such that the pre-shaped element can be released with zero shear load.

Between the first support edge and the second support edge above the support element the primary direction may be opposite to the first direction. Between the first support edge and the second support edge above the support element the secondary direction may be opposite to the second direction. By moving the support element and the belt above the support element at the same velocity with opposite directions, pre-shaped elements, such as pre-assembled fibre sheets, can be collected and/or released while maintaining their shape and/or orientation of fibres.

The movement of the support element in the first direction with the first velocity and/or the movement of the belt in the primary direction with the primary velocity may be stopped when collection of the pre-shaped element has been completed, e.g. when the pre-shaped element is supported by the belt, e.g. when the pre-shaped element can be repositioned by repositioning the engagement part.

The movement of the support element in the second direction with the second velocity and/or movement of the belt in the secondary direction with the secondary velocity may be stopped when the pre-shaped element is released from the belt. Alternatively, the movement of the support element in the third direction with the third velocity and/or movement of the belt in the tertiary direction with the tertiary velocity may be stopped when the pre-shaped element is released from the belt. After releasing the pre-shaped element, the pre-shaped element may be in the second element position, e.g. aligned with the blade shell part.

The apparatus may comprise an alignment unit. The support element may comprise a plurality of alignment units, including a first alignment unit and a second alignment unit. An alignment unit, such as the first alignment unit and/or the second alignment unit may comprise a sensor, such as a laser, video, ultrasonic or other suitable sensor. The alignment unit(s) may be configured to determine a relative location of the engagement part and/or the support element.

The alignment unit(s) may be attached to the engagement part, e.g. on the support element, such as on the first support edge and/or the second support edge, on a main body of the engagement part, and/or on an arm supporting the engagement part. The alignment unit(s) may be movable, e.g. may be rotatable around a joint, e.g. to send and receive signals in different directions.

The alignment unit(s) may be configured to send and receive a signal to determine a relative location with respect to an object, such as a pre-shaped element, e.g. to measure a distance and orientation between the engagement part and the object. The alignment unit(s) may be configured to determine a relative location of a pre-shaped element for collecting. The alignment unit(s) may be configured to determine a relative location of a pre-shaped element, e.g. in a mould, for aligning placement of another pre-shaped element.

The first alignment unit and the second alignment unit may be spaced apart, e.g. the first alignment unit may be located on the support element and the second alignment unit may be located on the main body. Having two or more sensor may increase the precision and depth indicative data received by the sensors.

The first direction may be perpendicular to the first support edge and/or the second support edge. The second direction may be perpendicular to the first support edge and/or the second support edge. The third direction may be perpendicular to the first support edge and/or the second support edge.

The support element may be of metal or composite material. The surface of the support element may have low friction, e.g. the surface may be smooth, e.g. polished.

The engagement part may comprise a main body, e.g. a housing. The support element may be configured to protrude relative to the main body, such as from the main body. Moving the support element in the first direction may comprise extending the support element relative to the main body such that the support element protrudes to a protruded position relative to the main body. In the protruded position the support element may abut from the main body such that part of the support element extends underneath the pre-shaped element.

Moving the support element in the second direction may comprise retracting the support element relative to the main body, e.g. such that the support element retracts to a retracted position relative to the main body. In the retracted position the support element may be aligned with the main body, e.g. the support element may be arranged underneath the main body, or the support element may be arranged inside the main body, e.g. the support element may be enclosed by the main body.

The belt may be fixed relative to the main body, e.g. at a primary end and/or at a secondary end. The secondary end may be attached to a storage element, e.g. a drum or a cylinder, to store a part of the belt when the support element is in the retracted position. For example, excess belt material may be wound around an internal axis of the storage element when the support element is in the retracted position.

The belt may form a closed loop around the support element, e.g. the primary end of the belt may be attached to the secondary end of the belt. The support element may comprise a first roller forming the first support edge. The support element may comprise a second roller forming the second support edge. The belt may form a closed loop around the first support edge, e.g. formed by the first roller, and the second support edge, e.g. formed by the second roller.

The belt may be of a low friction material, e.g. light fabric coated with fluoropolymer, e.g. polytetrafluoroethylene (PTFE). The belt may comprise a fabric. The belt and/or the fabric of the belt may comprise a first belt surface and a second belt surface. The first belt surface may be facing and/or configured for facing the support element. The second belt surface may be facing and/or configured for facing the pre-shaped element. The first belt surface, e.g. the surface facing the support element, may be of a low friction material. The second belt surface, e.g. the surface facing the pre-shaped element, may be of high friction, e.g. fabric with high friction properties or fabric coated with rubber, silicone, thermoplastic or composites thereof. The first belt surface may be coated with low friction material and/or the second belt surface may be coated with high friction material.

The apparatus may comprise an arm supporting the engagement part. The arm may be configured to be arranged in a first configuration. The arm may be configured to be arranged in a second configuration. The arm may be configured to be arranged between the first configuration and the second configuration. Positioning the engagement part in the first position may comprise arranging the arm in the first configuration. Positioning the engagement part in the second position may comprise arranging the arm in the second configuration. Moving the support element in the first direction may comprise rearranging the arm to move the engagement part with the support element in the first direction. Moving the support element in the second direction may comprise rearranging the arm to move the engagement part with the support element in the second direction.

The apparatus may comprise a plurality of engagement parts, e.g. the engagement part and an auxiliary engagement part. The plurality of engagement parts may be spaced apart. For example, the engagement part and the auxiliary engagement part may be spaced apart. The plurality of engagement part may be individually movable. Each of the plurality of engagement parts may be similar to the engagement part as disclosed in the present disclosure. The engagement part and the auxiliary engagement part may extend serially in a longitudinal direction, e.g. the second support edge of the engagement part may be aligned with the first support edge of the auxiliary engagement part, e.g. the engagement part and the auxiliary engagement part may be arranged in series. The pre-shaped element may be collected by the engagement part and the auxiliary engagement part. The support element of the auxiliary engagement part may be denoted "auxiliary support element". The support element of the engagement part may move in the first direction until the belt supports at least a first part of the pre-shaped element. The auxiliary support element of the auxiliary engagement part may move in an auxiliary first direction until the belt supports at least a second part of the pre-shaped element. The pre-shaped element may be collected by the belt of the engagement part supporting the first part of the pre-shaped element and the belt of the auxiliary engagement part supporting the second part of the pre-shaped element.

The support element of the engagement part may move in the first direction with a first velocity while moving the belt of the engagement part relative to the support element around the first support edge of the engagement part in a primary direction with a primary velocity, wherein the first velocity and the primary velocity are the same. The auxiliary support element of the auxiliary engagement part may move in the auxiliary first direction with an auxiliary first velocity while moving the belt of the auxiliary engagement part relative to the auxiliary support element around the first support edge of the auxiliary engagement part in an auxiliary primary direction with an auxiliary primary velocity, wherein the auxiliary first velocity and the auxiliary primary velocity are the same. The first direction and the auxiliary first direction may be the same. The first velocity and the auxiliary first velocity may be the same. The primary velocity and the auxiliary primary velocity may be the same.

The apparatus may be moved. The apparatus may comprise a cart. The engagement part may be supported by the arm at a first arm end. The arm may be connected to the cart at a second arm end. The apparatus may be movable relative to a mould for a blade shell part of a wind turbine, e.g. by movement of the cart relative to the mould. For example, the apparatus may be movable along a longitudinal direction of the mould.

The apparatus may comprise a track. The track may extend parallel to the mould, such as along the longitudinal direction of the mould. The apparatus may move, e.g. by sliding the apparatus on the track, relative to the mould. Alternatively, the apparatus may comprise turnable wheels, which may allow the apparatus to move unrestricted of tracks.

The apparatus may be moved after collecting the pre-shaped element. Alternatively, the apparatus may be moved while positioning the engagement part in a first position, or the apparatus may be moved while collecting the pre-shaped element, or the apparatus may be moved while releasing the pre-shaped element, or the apparatus may be moved while positioning the engagement part in the second position, or the apparatus may be moved while releasing the pre-shaped element, or the apparatus may be moved after releasing the pre-shaped element.

The apparatus may comprise a rack. The rack may be configured to store the one or more pre-shaped elements, such as the first pre-shaped element. The rack may be a part of the cart. Alternatively, the rack may be separate from the cart. The rack may be configured to provide a pre-shaped element, e.g. a first pre-shaped element, for collection by the apparatus.

The method may be used to manufacture a wind turbine blade and/or a part of a wind turbine blade, such as a spar cap, a spar beam, a blade shell part, a shear web, a spar box.

Although the present disclosure is mainly focused towards manufacturing a wind turbine blade, the method and the principles as described herein may be applied similarly to structures of other constructions and industries.

It is envisaged that any embodiments or elements as described in connection with any one aspect may be used with any other aspects or embodiments, mutatis mutandis.

BRIEF DESCRIPTION OF THE FIGURES

Embodiments of the invention will be described in more detail in the following with regard to the accompanying figures. Like reference numerals refer to like elements throughout. Like elements may, thus, not be described in detail with respect to the description of each figure. The figures show one way of implementing the present invention and are not to be construed as being limiting to other possible embodiments falling within the scope of the attached claim set. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

DETAILED DESCRIPTION

In the following figure description, the same reference numbers refer to the same elements and may thus not be described in relation to all figures.

Figure 1:
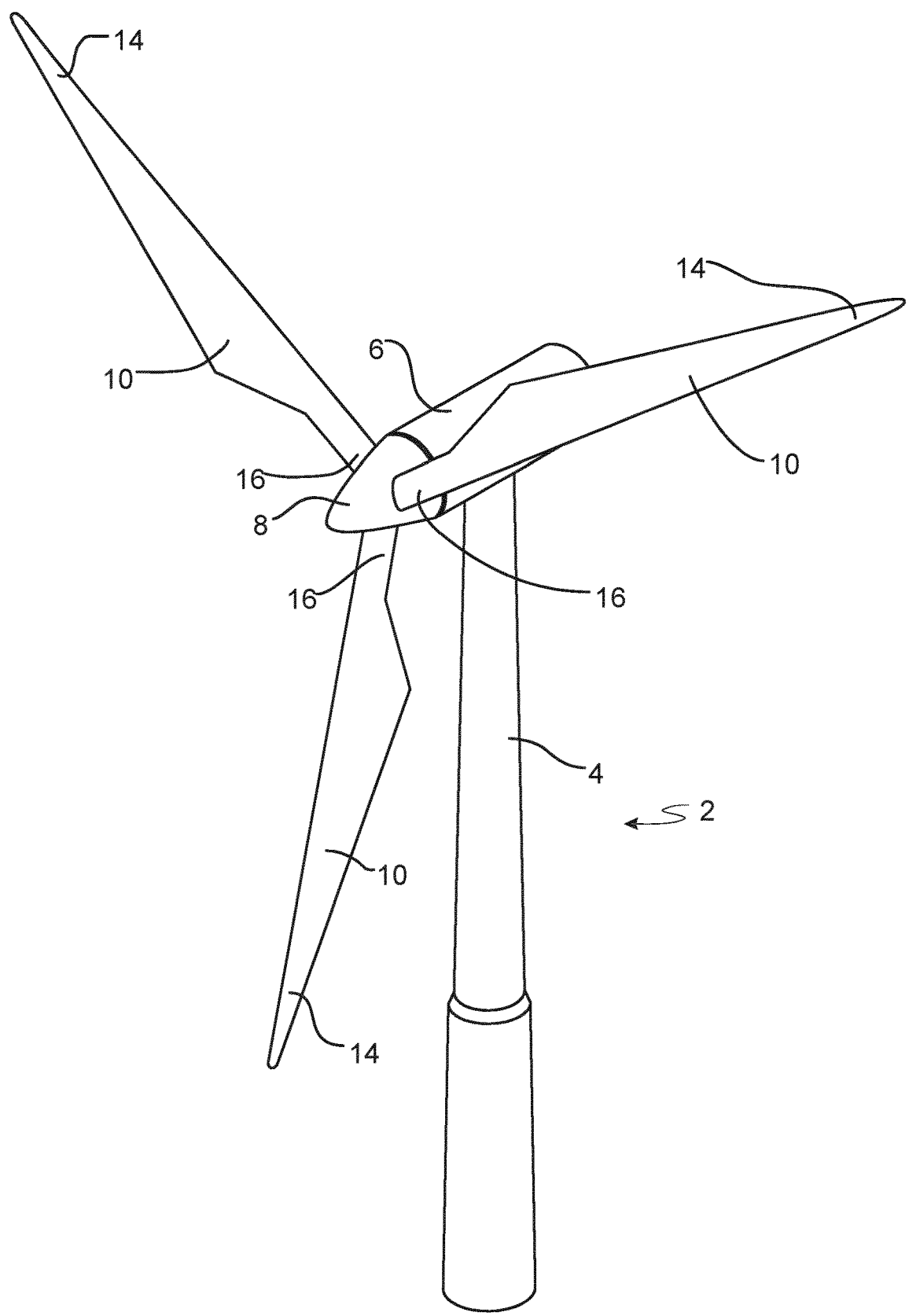
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
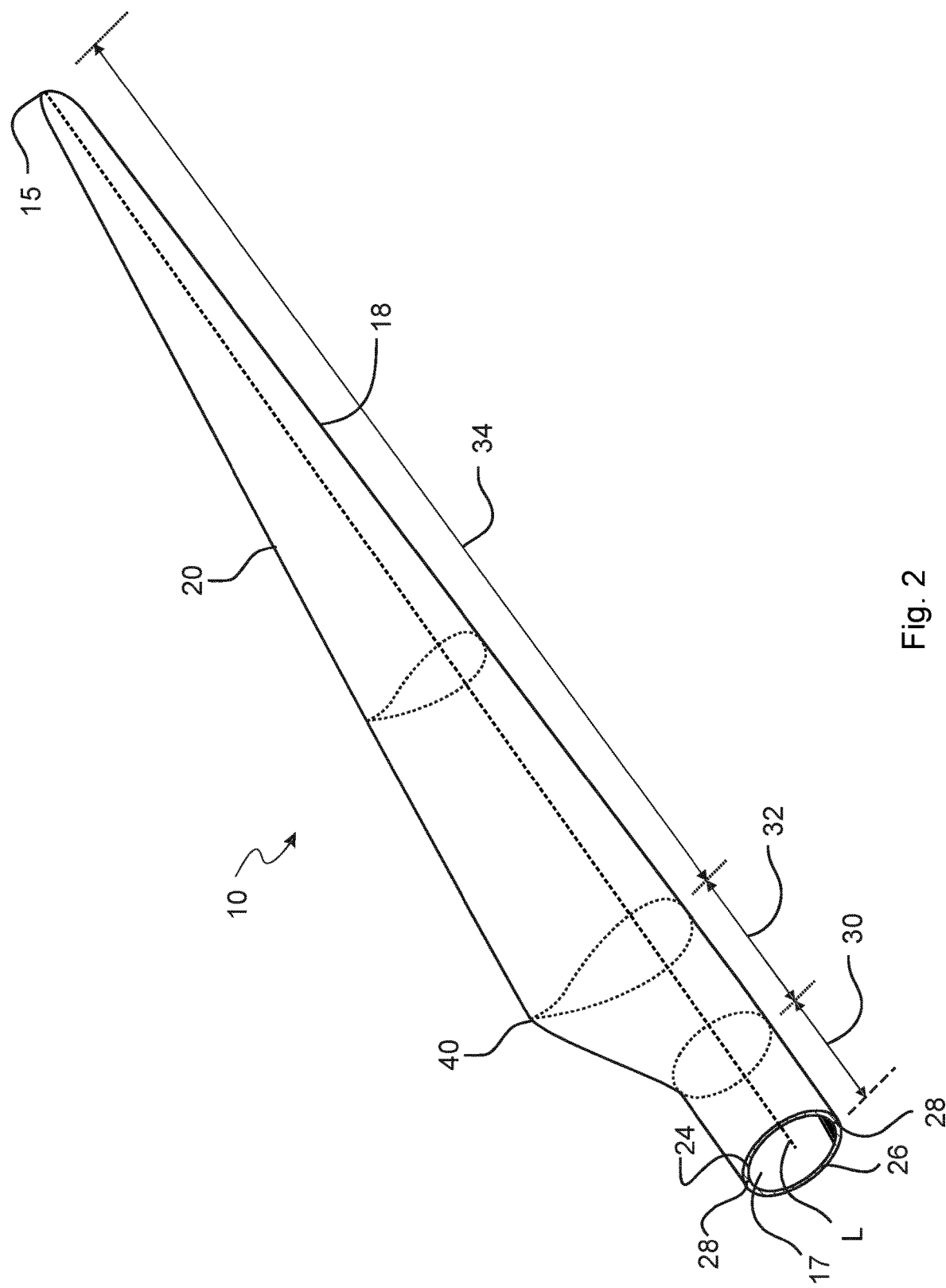
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts or half shells, a first blade shell part 24 and a second blade shell part 26, typically made of fibre-reinforced polymer. The wind turbine blade 10 may comprise additional shell parts, such as a third shell part and/or a fourth shell part. The first blade shell part 24 is typically a pressure side or upwind blade shell part. The second blade shell part 26 is typically a suction side or downwind blade shell part. The first blade shell part 24 and the second blade shell part 26 are fastened together with adhesive, such as glue, along bond lines or glue joints 28 extending along the trailing edge 20 and the leading edge 18 of the blade 10. Typically, the root ends of the blade shell parts 24, 26 has a semi-circular or semi-oval outer cross-sectional shape.

Figure 3:
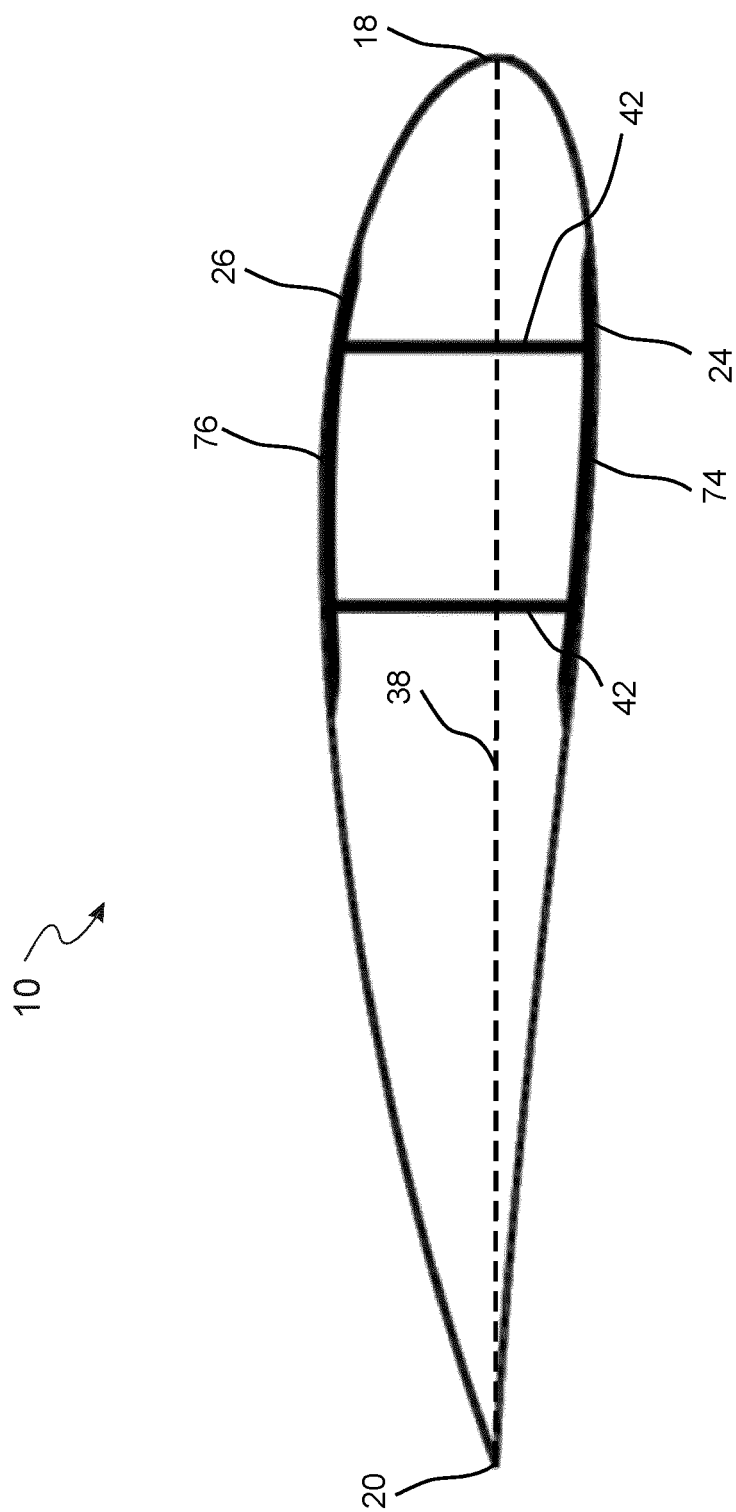
FIG. 3 is a schematic diagram illustrating an exemplary wind turbine blade.

FIG. 3 is a schematic diagram illustrating a cross sectional view of an exemplary wind turbine blade 10, e.g. a cross sectional view of the airfoil region of the wind turbine blade 10. The wind turbine blade 10 comprises a leading edge 18, a trailing edge 20, a pressure side 24, a suction side 26 a first spar cap 74, and a second spar cap 76. The wind turbine blade 10 comprises a chord line 38 between the leading edge 18 and the trailing edge 20. The wind turbine blade 10 comprises shear webs 42, such as a leading edge shear web and a trailing edge shear web. The shear webs 42 could alternatively be a spar box with spar sides, such as a trailing edge spar side and a leading edge spar side. The spar caps 74, 76 may comprise carbon fibres while the rest of the shell parts 24, 26 may comprise glass fibres.

Figure 4A:
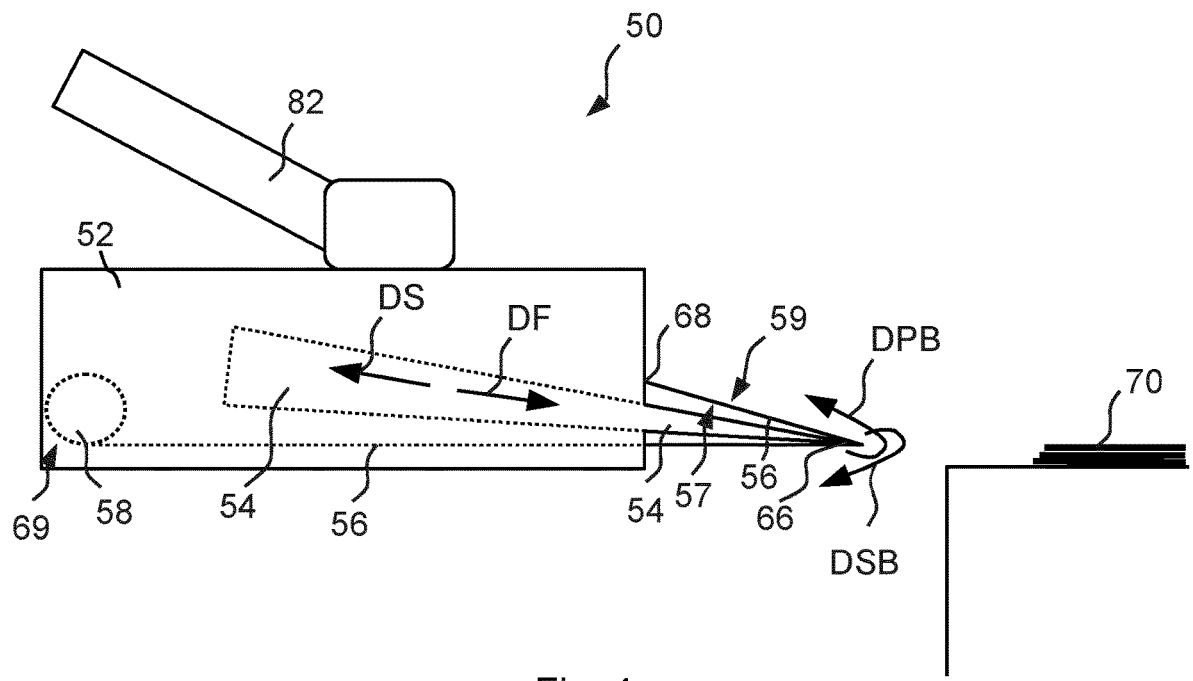
FIG. 4a-4c are schematic diagrams illustrating an exemplary engagement part of an apparatus.
Figure 4B:
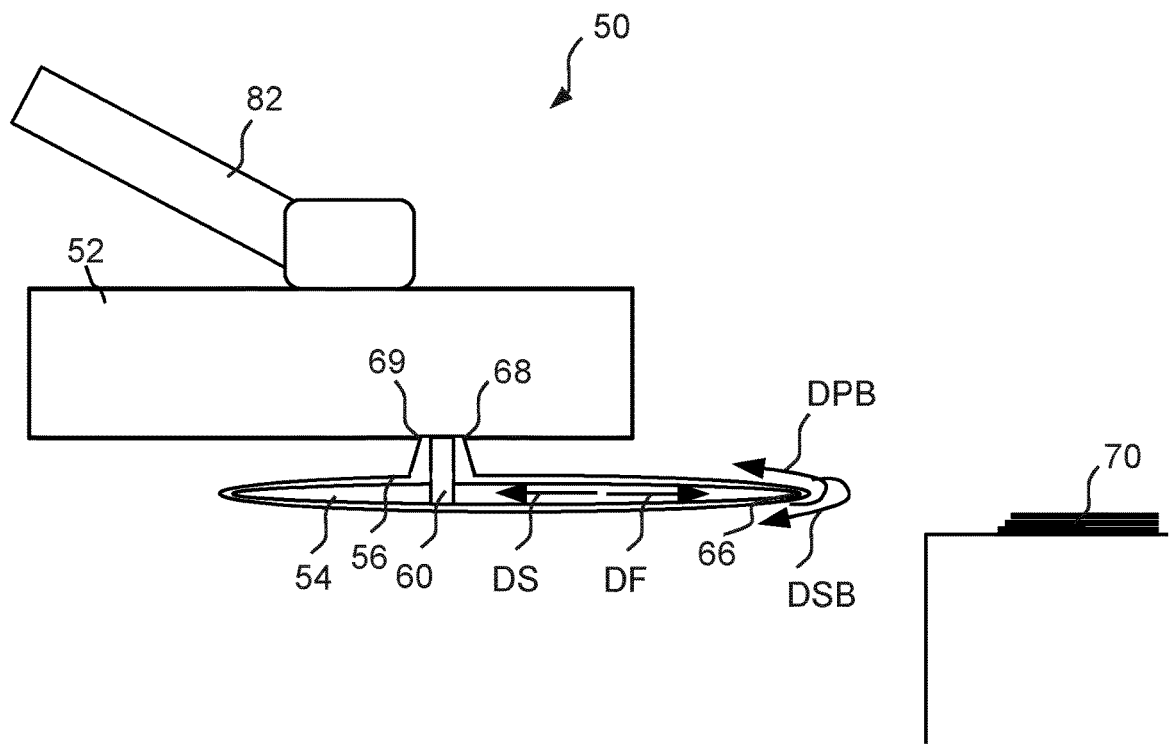
Figure 4C:
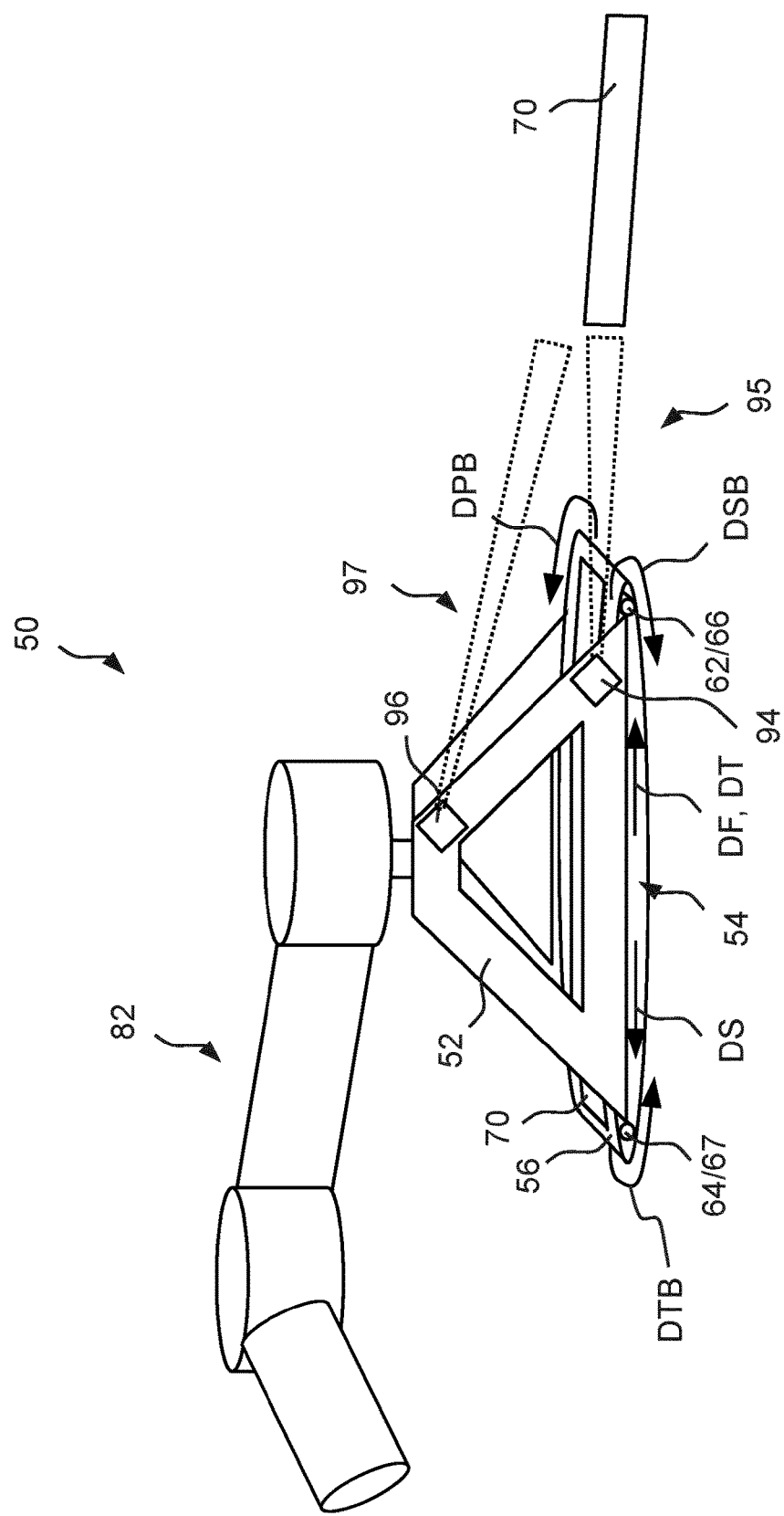

FIG. 4a-4c are schematic diagrams illustrating exemplary engagement parts 50 of an apparatus. The engagement part 50 is configured to engage with a pre-shaped element 70, e.g. to collect and release a pre-shaped element 70. The engagement part 50 comprises a main body 52, e.g. a housing, a belt 56 and a support element 54 comprising a first support edge 66. The belt 56 extends around at least a part of the support element 54. The engagement part 50 collects the pre-shaped element 70 by moving the support element 54 in a first direction DF with a first velocity. At the same time the belt 56 moves relative to the support element 54 around the first support edge 66 in a primary direction DPB from below the first support edge 66 to above the first support edge 66 with a primary velocity. The first velocity and the primary velocity are the same, such that the pre-shaped element 70 can be collected with little or no structural disturbance to the pre-shaped element. Movement of the belt 56 and the support element 54 stops when the pre-shaped element 70 has been collected, e.g. when the pre-shaped element 70 is supported by the belt 56. Thereafter, the engagement part 50 may be repositioned to move the pre-shaped element 70 to a desired position.

The support element 54 may retract in a second direction DS, e.g. opposite the first direction DF, with a second velocity relative to the main body 52, such that the support element 54 retracts to a retracted position relative to the main body 52. At the same time the belt 56 moves relative to the support element 54 around the first support edge 66 in a secondary direction DSB from above the first support edge 66 to below the first support edge 66 with a secondary velocity. The second velocity and the secondary velocity are the same, such that the pre-shaped element 70 can be released with little or no structural disturbance to the pre-shaped element. Movement of the belt 56 and the support element 54 stops when the pre-shaped element 70 has been released, e.g. when the pre-shaped element 70 no longer contacts the belt 56.

The engagement part 50 is supported by an arm 82. In FIG. 4a-4b the support element 54 is illustrated as a plate and the edge of the support element 54 forms the first support edge 66. In FIG. 4c the support element is illustrated comprising a plurality of rollers, wherein a first roller 62 forms the first support edge 66. The support element 54 may be of a metal material or composite material with a low friction surface. The belt 56 may be of a low friction material, e.g. light fabric coated with fluoropolymer, e.g. polytetrafluoroethylene (FIFE). A first belt surface 57 of the belt 56, e.g. the surface facing the support element 54, may be of a low friction material. A second belt surface 59 of the belt 56, e.g. the surface for facing the pre-shaped element 70, may be of high friction, e.g. fabric with high friction properties or fabric coated with rubber, silicone, thermoplastic or composites thereof.

FIG. 4a illustrates the support element 54 extending towards a protruded position by the support element 54 moving in the first direction DF. In the final protruded position, the support element 54 may protrude from the main body such that part of the support element 54 extends underneath the pre-shaped element 70. The support element 54 may retract to a retracted position, by the support element 54 moving in the second direction DS, where the support element 54 may be enclosed by the main body 52. The belt 56 is fixed relative to the main body 52 at a primary end 68. The belt 56 may be attached to a storage element 58 at a secondary end 69 and part of the belts may be stored in a storage element 58, e.g. a drum or a cylinder, when the support element 54 is in the retracted position. The belt 56 may have a releasing mechanism, such as a spring, which allows release of the belt 56 when the support element 54 protrudes towards the protruded position. The same mechanism may collect the belt 56 back to the storage element 58, e.g. roll up the belt, when the support element 54 is repositioned to the retracted position.

In FIG. 4b the support element 54 is moved by displacing the support element 54 relative to the main body 52. The support element 54 may be displaced by the displacement means 60, e.g. gears, configured to move the support element 54 in the first direction DF and in the second direction DS. In the protruded position the support element 54 may protrude from the main body such that part of the support element 54 extends underneath the pre-shaped element 70. In the retracted position the support element 54 may be positioned underneath the main body 52. The belt 56 is fixed relative to the main body 52 at a primary end 68 and at a secondary end 69. Thereby movement of the support element 54 in the first direction DF and/or in the second direction DS may cause an opposite movement of the belt 56 relative to the support element 54.

Figure 5:
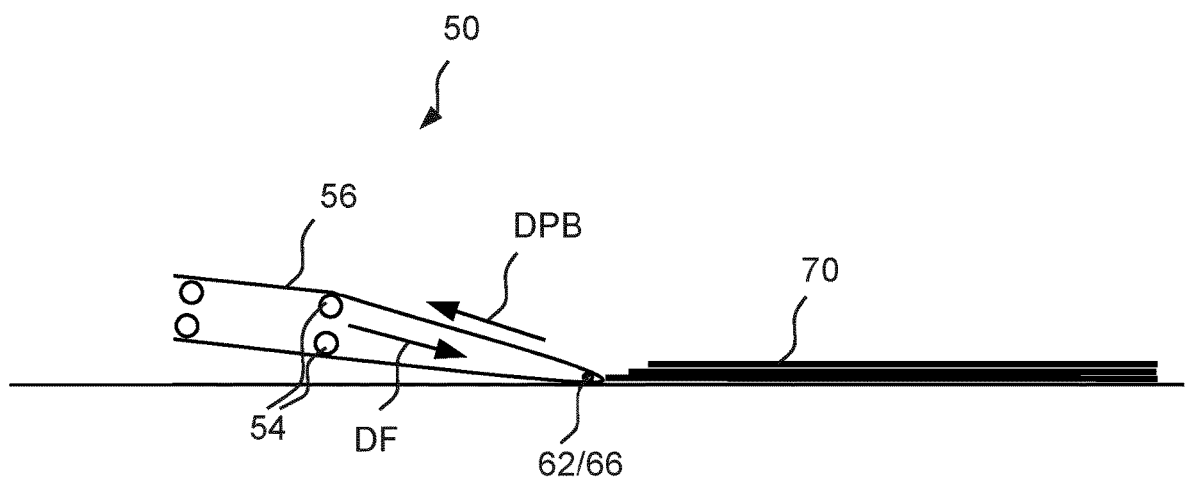
FIG. 5 is a schematic diagram illustrating an exemplary engagement part of an apparatus.

In FIG. 4c the main body 52 is connected to the support element 54 between the first support edge 66 and a second support edge 67, e.g. on both sides, as illustrated in FIG. 4c, or alternatively only on one side. The support element 54 comprises a first roller 62 forming the first support edge 66 and a second roller 64 forming the second support edge 67. Only the first roller 62 and the second roller 64 are illustrated in FIG. 4c, however, the support element 54 may comprise more rollers between the first roller 62 and the second roller 64 (as illustrated in FIG. 5). Alternatively or additionally, a plate may be disposed between the first roller 62 and the second roller 64. The belt 56 forms a closed loop around the first roller 62 and the second roller 64, e.g. by attaching the ends, e.g. the primary end and the secondary end, of the belt to each other. The support element 54 is moved in the first direction DF with the first velocity by movement of the arm 82.

To release the pre-shaped element 70 the engagement part 50 is moved in the second direction DS with the second velocity by movement of the arm 82 while moving the belt 56 in the secondary direction DSB. Alternatively, the pre-shaped element 70 may be collected/and or released over the second support edge 67. For example, the pre-shaped element 70 may be released from the second support edge 67, e.g. by moving the support element 54 in a third direction DT, e.g. the same as the first direction DF, with a third velocity and moving the belt 56 in tertiary direction DTB, e.g. the same as the primary direction DPB, around the second support edge 67 from above the second support edge 67 to below the second support edge 67 with a tertiary velocity, which is adjusted to be the same as the third velocity. Thus, the pre-shaped element 70 may be collected via the first support edge 66 and released via the second support edge 67, or the pre-shaped element 70 may be collected via the first support edge 66 and released via the first support edge 66.

The engagement part 50 may comprise one or more alignment units, such as a first alignment unit 94 and/or a second alignment unit 96. The alignment units 94, 96 may comprise an optical sensor which may send and receive optical signals 95, 97 to determine a relative location of a pre-shaped element 70 for collection. Alternatively, the alignment units 94, 94 may determine a relative location of a pre-shaped element 70, e.g. in a mould, for aligning the placement of another pre-shaped element 70. The alignment units 94, 96 may alternatively comprise an ultrasonic sensor, a video sensor or any other suitable sensor. The first alignment unit 94 and the second alignment unit 96 may be spaced apart, e.g. the first alignment sensor 94 may be located on the support element 54, such as on the first support edge 66 or the first roller 62, and the second alignment unit 96 may be located on the main body 52.

FIG. 5 is a schematic diagram illustrating part of an exemplary engagement part 50 of an apparatus, such as the engagement part illustrated in FIG. 4a-4c. FIG. 5 illustrates the first support edge 66 of the support element 54. FIG. 5 could alternatively illustrate the second support edge. The engagement part 50 comprises a belt 56 extending around the support element 54. In FIG. 5 the support element 54 is illustrated to comprise a plurality of rollers, alternatively the support element could comprise a plate or be formed by a plate, such as illustrated in FIG. 4a-4b. The support element 54 moves in the first direction DF with the first velocity by moving the engagement part 50, e.g. by moving an arm supporting the engagement part 50. While the support element 54 of the engagement part 50 moves, the belt 56 moves relative to the support element 54 around the first support edge 66 in a primary direction DPB from below the first support edge 66 to above the first support edge 66 with a primary velocity. The first velocity and the primary velocity are the same, such that the pre-shaped element 70 can be collected with little or no structural disturbance to the pre-shaped element. Movement of the belt 56 and the support element 54 may stop when the pre-shaped element 70 has been collected, e.g. when the pre-shaped element 70 is supported by the belt 56. Unloading or releasing of the pre-shaped element 70 may be provided by reversing the described operation.

Figure 6:
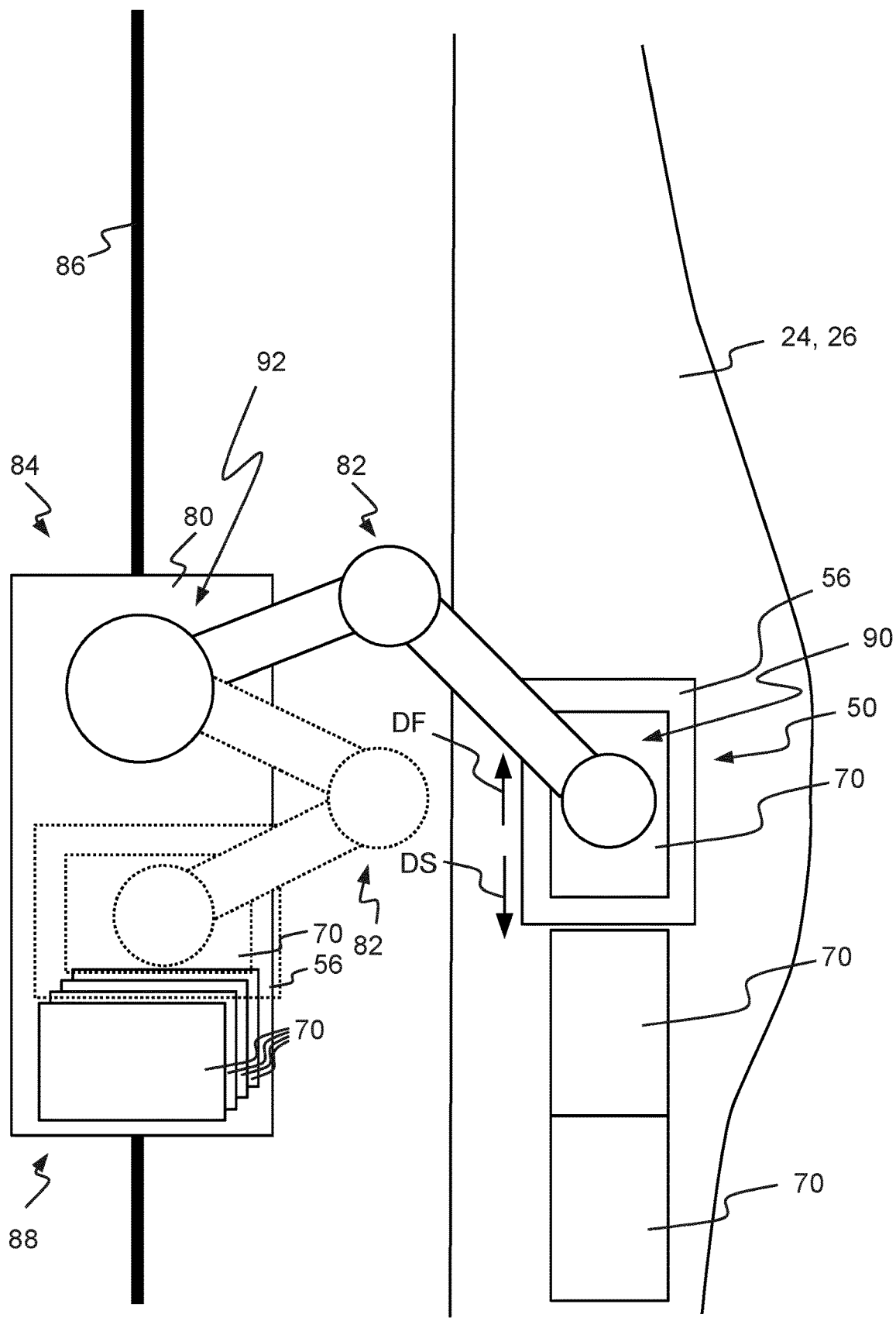
FIG. 6 is a schematic diagram illustrating an exemplary apparatus.

FIG. 6 is a schematic diagram illustrating an exemplary apparatus 84, such as an apparatus for manufacturing a wind turbine blade and/or a part of a wind turbine blade. The apparatus 84 comprises an engagement part 50, such as the engagement part 50 of FIG. 4a-4c and/or FIG. 5, comprising a belt 56 which extends around a support element (not shown). The engagement part 50 may be positioned in a first position, illustrated by the dashed lines. The engagement part 50 may be positioned in the first position by arranging the arm 82 in a first configuration, as illustrated by the dashed lines. The engagement part 50 in the first position may be arranged above or next to a rack 88, e.g. on a cart 80. The engagement part 50 is supported by the arm 82 at a first arm end 90. The arm 82 is connected to the cart at a second arm end 92. In the first position the engagement part 50 collects a pre-shaped element 70 in a first element position, such as in a position on a surface on the rack 88 on to the belt 56. The rack 88 may hold a plurality of pre-shaped elements 70. The rack 88 may be configured to provide a pre-shaped element for collection by the apparatus 84. When the pre-shaped element 70 has been collected from the rack 88, the rack 88 may be configured to provide another pre-shaped element 70, e.g. automatically, for collection by the apparatus 84. The engagement part 50 may be positioned in a second position, illustrated by the solid lines. The engagement part 50 may be arranged in the second position by arranging the arm 82 in a second configuration, as illustrated by the solid lines. The engagement part 50 may be arranged above a blade shell part 24, 26 in the second position. In the second position the engagement part 50 may release the pre-shaped element 70 from the belt 56 onto a surface, such as an inner surface of a first blade shell part 24 or a second blade shell part 26 of a wind turbine blade, such as the wind turbine blade 10 of FIGS. 1-3. Collecting and/or releasing the pre-shaped element 70 from the engagement part 50 may be performed as described under FIG. 4a-4c. The pre-shaped element 70 may thereby be arranged in a second element position and aligned with the blade shell part 24, 26.

The apparatus 84 comprises a mobile cart 80, which may move along a track 86. Alternatively, the cart 80 may comprise turnable wheels to move unrestricted along the mould of the blade shell part 24,26. The apparatus may move while the engagement part 50 changes position, or the apparatus may move after collecting or releasing the pre-shaped element 70. After the pre-shaped element 70 is released from the engagement part 50, the engagement part 50 may be arranged in the first position by arranging the arm 82 in the first configuration. In the first configuration the engagement part 50 may collect another pre-shaped element 70 from the rack 88. The engagement part 50 may be arranged in the second position by arranging the arm 82 in the second configuration to place the another pre-shaped element 70 in the blade shell part 24, 26.

Figure 7:
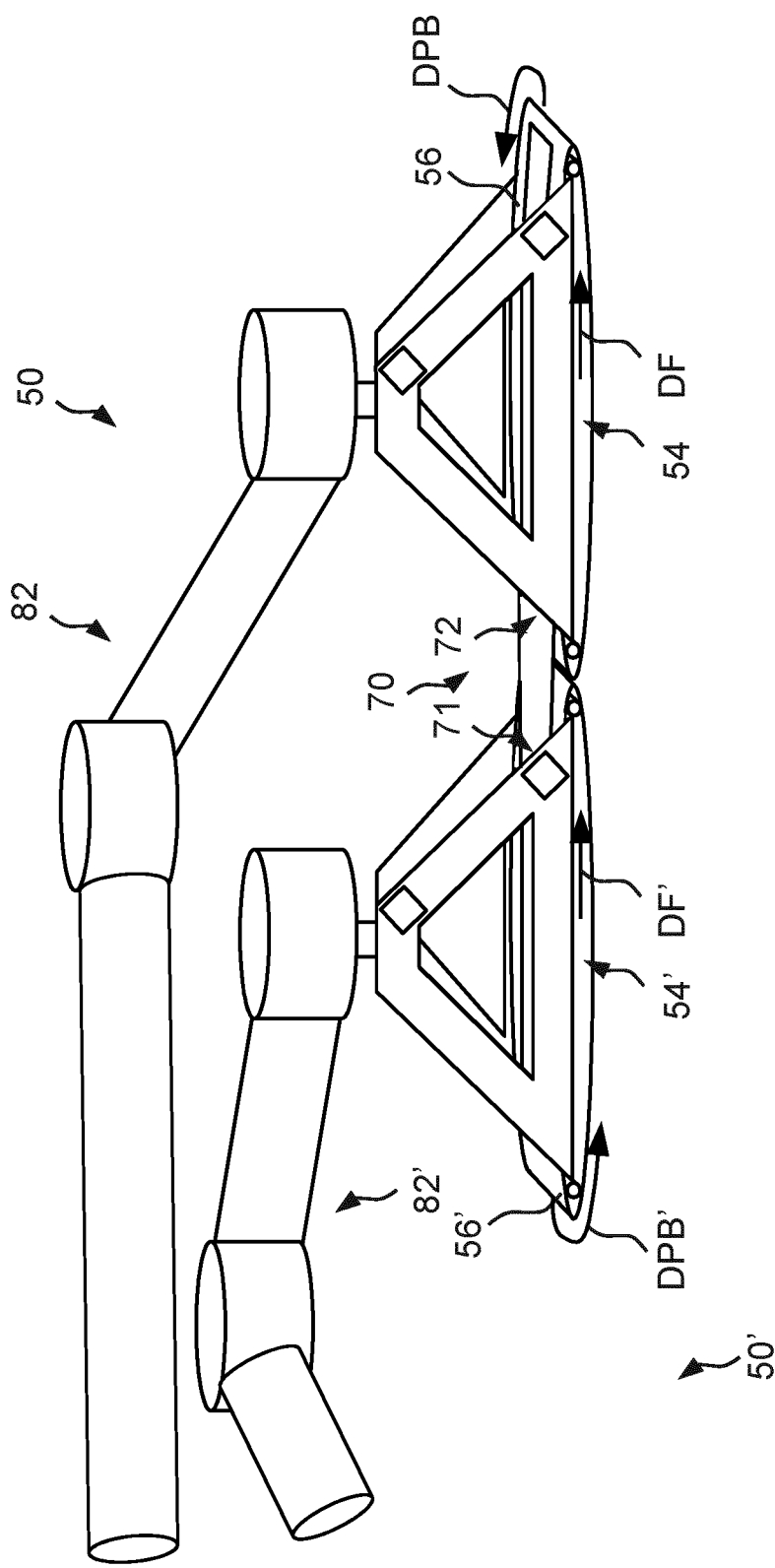
FIG. 7 is a schematic diagram illustrating exemplary engagement parts of an apparatus.

FIG. 7 is a schematic diagram illustrating a plurality of engagement parts 50, 50' including the engagement part 50 and an auxiliary engagement part 50'. The engagement part 50' and the auxiliary engagement part 50' may be identical to the engagement part 50 described in the previous figures.

The engagement part 50 and the auxiliary engagement part 50' may be arranged serially in the longitudinal direction such that the first engagement part 50 is arranged in front of the second engagement part 50'. The engagement part 50 and the auxiliary engagement part 50' are spaced apart, e.g., such that the belts 56, 56' are spaced apart. This arrangement is particularly useful for collecting long elements. For example, a long pre-shaped element 70 is collected partly by the engagement part 50 and partly by the auxiliary engagement part 50'. In order to collect the long pre-shaped element, the support element 54 of the engagement part 50 may move in the first direction DF while the belt 56 moves in a primary direction DPB until the belt supports at least a first part of the pre-shaped element 71. The auxiliary support element 54' of the auxiliary engagement part 50' may be positioned behind the support element 54 of the engagement part 50. The auxiliary support element 54' may move in an auxiliary first direction DF' while the auxiliary belt 56' moves in an auxiliary primary direction DPB' simultaneously as the support element 54 moves in first direction DF and the belt 56 moves in a primary direction DPB until the belt supports at least a second part of the pre-shaped element 72. The pre-shaped element 70 may be collected in a continuous movement or in steps. For example, during the continuous movement the engagement part 50 and the auxiliary engagement part 50' may move together as one elongated engagement part and collect the entire pre-shaped element 70, e.g. the first part 71 and second part 72, in one step. During movement in steps, the engagement part 50 may collect the first part 71 of the pre-shaped element 70 in a first step, and alternatively stop while the auxiliary engagement part 50' is positioned behind the engagement part 70, and as a second step the engagement part 50 and the auxiliary engagement part 50' move as one elongated engagement part to collect the second part 72 of the pre-shaped element 70.

The engagement part 50 and the auxiliary engagement part 50' may be attached to the same apparatus with the arms 82, 82'. Alternatively, the engagement part 50 may be attached to an apparatus and the auxiliary engagement part 50' may be attached to an auxiliary apparatus.

Figure 8:
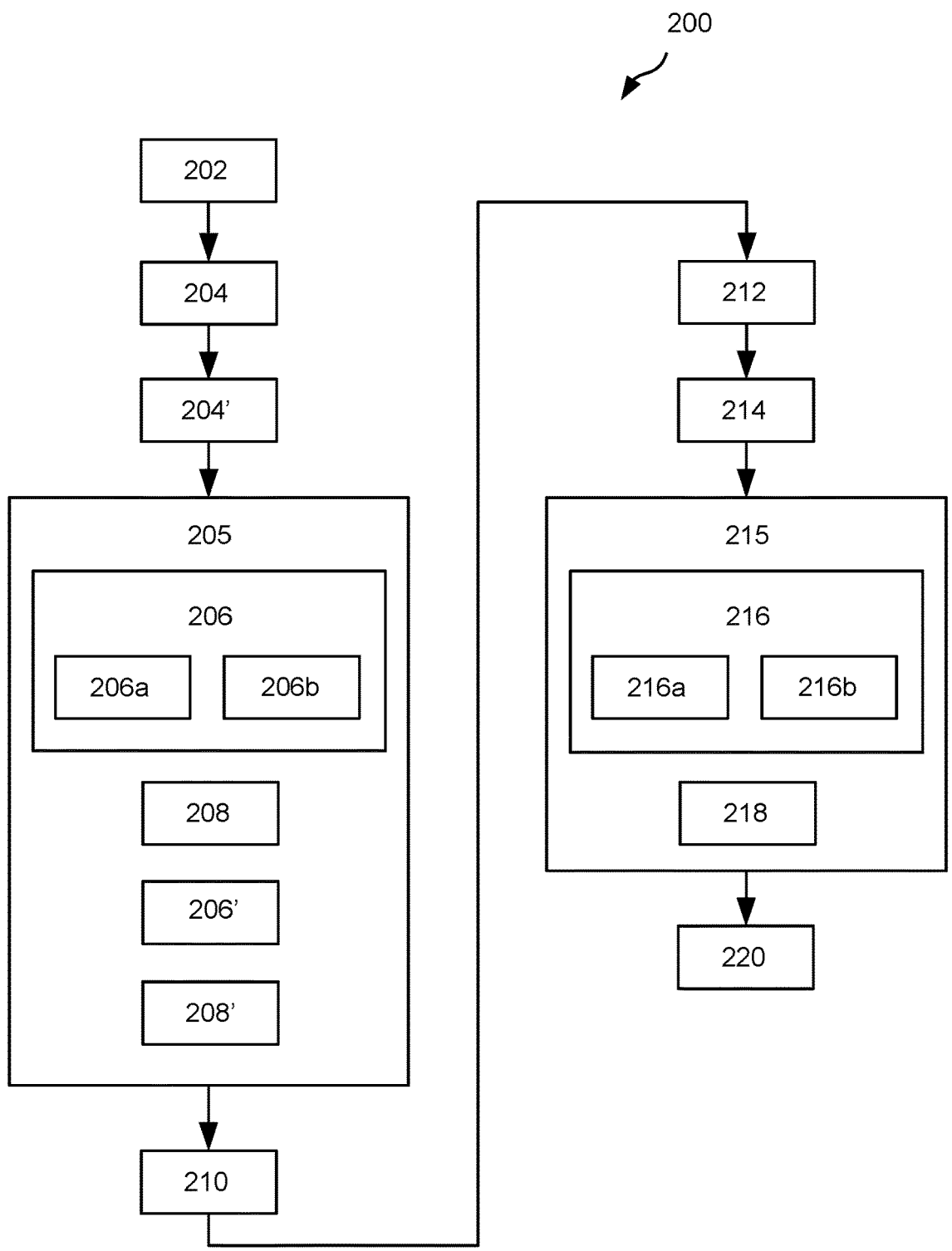
FIG. 8 is a block diagram of an exemplary method.

FIG. 8 is a block diagram of an exemplary method 200 for manufacturing a wind turbine blade, such as the wind turbine blade of FIG. 1-3, the method 200 comprising the use of an apparatus, such as the apparatus described in FIG. 6. The method 200 comprises providing 202 one or more pre-shaped elements, including a first pre-shaped element, in a first element position. The first element position may be on a rack, e.g. on a cart.

The method 200 comprises positioning 204 the engagement part in a first position. In the first position the engagement part may be arranged above or next to the first pre-shaped element, e.g. above or next to the rack holding the first pre-shaped element.

The method 200 comprises collecting 205 the pre-shaped element, wherein collecting the pre-shaped element comprises moving 206 the support element in a first direction with a first velocity to extend underneath the first pre-shaped element. Moving 206 the support element may comprise extending 206a the support element relative to the main body, such that the support element protrudes to a protruded position relative to the main body or moving 206b an arm supporting the engagement part to move the engagement part and thereby moving the support element. In the protruded position the support element may extent from the main body, e.g. such that part of the support element extends underneath a pre-shaped element.

Collecting 205 the pre-shaped element further comprises moving 208 the belt relative to the support element around the first support edge in a primary direction from below the first support edge to above the first support edge with a primary velocity, e.g. while moving 206 the support element in the first direction with the first velocity. Moving 206 the support element and moving 208 the belt are coordinated such that the first velocity and the primary velocity are the same.

A long pre-shaped element may be collected partly by the engagement part with a moving 206 support element and a moving 208 belt, and partly by an auxiliary engagement part with a moving 206' auxiliary support element and a moving 208' auxiliary belt.

Thus, the method 200 may comprise positioning 204' the auxiliary engagement part in an auxiliary first position. In the auxiliary first position the auxiliary engagement part may be arranged above or next to the first pre-shaped element, e.g. above or next to the rack holding the first pre-shaped element. In the auxiliary first position the auxiliary engagement part may be arranged serially behind the engagement part in the longitudinal direction.

In order to collect the long pre-shaped element, the support element of the engagement part may move 206 in the first direction while the belt moves 208 in a primary direction until the belt supports at least a first part of the pre-shaped element. The auxiliary support element of the auxiliary engagement part may be positioned behind the support element of the engagement part. The auxiliary support element may move 206' in an auxiliary first direction while the auxiliary belt moves 208' in an auxiliary primary direction simultaneously as the support element moves 206 in first direction and the belt moves 208 in a primary direction until the belt supports at least a second part of the pre-shaped element. The pre-shaped element may be collected 205 in a continuous movement or in steps. For example, during the continuous movement the engagement part and the auxiliary engagement part may move together as one elongated engagement part and collect the entire pre-shaped element, e.g. the first part and second part, in one step. During movement in steps, the engagement part may collect the first part of the pre-shaped element in a first step, and alternatively stop while the auxiliary engagement part is positioned 204' behind the engagement part, and as a second step the engagement part and the auxiliary engagement part move as one elongated engagement part to collect the second part of the pre-shaped element.

Collecting 205 the pre-shaped element may comprise moving 206' an auxiliary support element in an auxiliary first direction with an auxiliary first velocity to extend underneath the first pre-shaped element. Collecting 205 the pre-shaped element may further comprise moving 208' an auxiliary belt relative to the auxiliary support element around an auxiliary first support edge in an auxiliary primary direction from below the auxiliary first support edge to above the auxiliary first support edge with an auxiliary primary velocity, e.g. while moving 206' the auxiliary support element in the auxiliary first direction with the auxiliary first velocity. Moving 206' the auxiliary support element and moving 208' the auxiliary belt are coordinated such that the auxiliary first velocity and the auxiliary primary velocity are the same.

The first direction and the auxiliary first direction may be the same. The first velocity and the auxiliary first velocity may be the same. The primary velocity and the auxiliary primary velocity may be the same.

The method 200 comprises stopping 210 the movement of the support element and the belt when collection of the pre-shaped element has been completed, e.g. when the pre-shaped element is supported by the belt and the support element. Alternatively, the movement may be stopped 210 when the pre-shaped element is supported by the belt and the support element in addition to the auxiliary belt and the auxiliary support element.

The method 200 comprises moving 212 the apparatus along the mould of the blade shell part. In FIG. 8 moving 212 the apparatus is illustrated after collecting 205 the pre-shaped element, however, moving 212 the apparatus may be performed concurrently with positioning 204 the engagement part in the first position and/or collecting 205 the pre-shaped element.

The method 200 comprises positioning 214 the engagement part in a second position. In the second position the engagement part may by arranged above a blade shell part.

The method 200 comprises releasing 215 the pre-shaped element from the belt. Releasing 215 the pre-shaped element comprises moving 216 the support element in a second direction with a second velocity. Moving 216 the support element may comprise retracting 216a the support element relative to the main body, such that the support element retracts to a retracted position relative to the main body or moving 216b the arm supporting the engagement part to move the engagement part and thereby move the support element. In the retracted position the support element may be enclosed by the main body or the support element may be underneath the main body.

Releasing 215 the pre-shaped element further comprises moving 218 the belt relative to the support element, e.g. around the first support edge in a direction from above the first support edge to below the first support edge with a secondary velocity or around the second support edge in a direction from above the second support edge to below the second support edge with a tertiary velocity, e.g. while moving 216 the support element in the second direction. Moving 216 the support element and moving 218 the belt is coordinated such that the second velocity and the secondary velocity or tertiary velocity are the same.

The apparatus may be moved 212 while positioning 214 the engagement part in the second position. The apparatus may be moved 212 while releasing 215 the pre-shaped element. The apparatus may be moved 212 after releasing 215 the pre-shaped element.

The method 200 comprises stopping 220 movement of support element and belt when the pre-shaped element is fully released from the belt and arranged in the second element position, e.g. wherein the pre-shaped element is aligned with the blade shell part.

The invention has been described with reference to preferred embodiments. However, the scope of the invention is not limited to the illustrated embodiments, and alterations and modifications can be carried out without deviating from the scope of the invention.

Items

Exemplary embodiments of the present disclosure are set out in the following items:

1. A method for manufacturing, such as for manufacturing at least a part of a wind turbine blade, the method comprising the use of an apparatus comprising an engagement part, the engagement part comprising:
   a support element having a first support edge,
   a belt extending around the support element and forming a primary engagement edge of the engagement part along the first support edge of the support element,
   the method comprising:
   providing one or more pre-shaped elements, including a first pre-shaped element, in a first element position,
   positioning the engagement part in a first position,
   moving the support element in a first direction with a first velocity to extend underneath the first pre-shaped element,
   while moving the support element in a first direction with a first velocity, moving the belt relative to the support element around the first support edge in a primary direction from below the first support edge to above the first support edge with a primary velocity, wherein the first velocity and the primary velocity are the same, positioning the engagement part in a second position, releasing the pre-shaped element.
2. Method according to item 1, wherein releasing the pre-shaped element from the belt comprises:
moving the support element in a second direction with a second velocity,
while moving the support element in the second direction with the second velocity, moving the belt relative to the support element around the first support edge in a secondary direction from above the first support edge to below the first support edge with a secondary velocity, wherein the second velocity and the secondary velocity are the same.
3. Method according to any of the preceding items, wherein the pre-shaped element is aligned with a blade shell part in a second element position.
4. Method according to any of the preceding items, wherein the engagement part comprises a main body and wherein moving the support element in the first direction comprises extending the support element relative to the main body such that the support element protrudes to a protruded position relative to the main body.
5. Method according to any of the preceding items, wherein the engagement part comprises a main body and wherein moving the support element in the second direction comprises retracting the support element relative to the main body such that the support element retracts to a retracted position relative to the main body.
6. Method according to any of the preceding items, wherein the belt is fixed relative to a main body at a primary end and/or at a secondary end.
7. Method according to any of the preceding items, wherein the belt forms a closed loop around the support element.
8. Method according to any of the preceding items, wherein the apparatus comprises an arm supporting the engagement part, wherein positioning the engagement part in the first position comprises arranging the arm in a first configuration.
9. Method according to item 8, wherein positioning the engagement part in the second position comprises arranging the arm in a second configuration.
10. Method according to items 8-9, wherein moving the support element in the first direction or a second direction comprises rearranging the arm to move the engagement part.
11. Method according to any of the preceding items comprising moving the apparatus, e.g. by sliding the apparatus on a track, relative to a mould for a blade shell part of a wind turbine blade.
12. Method according to any of the preceding items, wherein providing the one or more pre-shaped elements comprises providing a rack with the one or more pre-shaped elements.
13. Method according to any of the preceding items, wherein the apparatus comprises an alignment unit, and wherein positioning the engagement part in the first position is based on input from the alignment unit and/or wherein positioning the engagement part in the second position is based on input from the alignment unit.
14. An apparatus for manufacturing, such as for manufacturing at least a part of a wind turbine blade, the apparatus comprising an engagement part, the engagement part comprising:
a support element having a first support edge,
a belt extending around the support element and forming a primary engagement edge of the engagement part along the first support edge of the support element,
wherein the apparatus is configured to:
position the engagement part in a first position to collect a first pre-shaped element of one or more pre-shaped elements,
move the support element in a first direction with a first velocity to extend underneath the first pre-shaped element,
move the belt relative to the support element around the first support edge in a primary direction from below the first support edge to above the first support edge with a primary velocity while the support element is moved in the first direction with the first velocity, wherein the first velocity and the primary velocity are the same,
position the engagement part in a second position, and
release the pre-shaped element.
15. Apparatus according to item 14, wherein the apparatus is configured to move the support element in a second direction with a second velocity, and move the belt relative to the support element around the first support edge in a secondary direction from above the first support edge to below the first support edge with a secondary velocity, wherein the second velocity and the secondary velocity are the same.
16. Apparatus according to any of items 14-15, wherein the engagement part comprises a main body and wherein the support element is configured to protrude relative to the main body.
17. Apparatus according to any of items 14-16, wherein the belt is fixed relative to a main body at the primary end and/or at the secondary end.
18. Apparatus according to any of items 14-17, wherein the support element comprises a first roller forming the first support edge, and a second roller forming a second support edge, and wherein the belt forms a closed loop around the first roller and the second roller of the support element.
19. Apparatus according to any of items 14-18 comprising an arm, wherein the arm is configured to be arranged in a first configuration and a second configuration, a cart,
wherein the engagement part is supported by the arm at a first arm end and the arm is connected to the cart at a second arm end, and wherein the apparatus is movable relative to a mould for a blade shell part of a wind turbine blade.
20. Apparatus according to any of items 14-19 comprising a track, wherein the track extends parallel to a mould for a blade shell part of a wind turbine blade.
21. Apparatus according to any of items 14-20 comprising a rack configured to store the one or more pre-shaped elements, including the first pre-shaped element.
22. Apparatus according to any of items 14-21, wherein the belt is made of a low friction material.
23. Apparatus according to any of items 14-22, wherein the support element is made of polished metal.
24. Apparatus according to any of items 14-23 comprising an alignment unit configured to determine a relative location of the engagement part and/or the support element.
25. Apparatus according to any of items 14-24 comprising a plurality of engagement parts including the engagement part and an auxiliary engagement part.

26. Apparatus according to item 25 wherein the engagement part and the auxiliary engagement part are spaced apart.

LIST OF REFERENCES 2 wind turbine
4 tower
6 nacelle
8 hub
10 blade
14 blade tip
15 tip end
16 blade root
17 root end
18 leading edge
20 trailing edge
24 first blade shell part (pressure side)
26 second blade shell part (suction side)
28 bond lines/glue joints
30 root region
32 transition region
34 airfoil region
34a first airfoil region
34b second airfoil region
40 shoulder
42 shear web or spar side
50 engagement part
50' auxiliary engagement part
52 main body
54 support element
54' auxiliary support element
56 belt
57 first surface
58 storage element
59 second surface
60 displacement means
62 first roller
64 second roller
66 first support edge
67 second support edge
68 primary end
69 secondary end
70 pre-shaped element
71 first part of pre-shaped element
72 second part of pre-shaped element
74 first spar cap
79 second spar cap
80 cart
82 arm
84 apparatus
86 track
88 rack
90 first arm end
92 second arm end
94 first alignment unit
95 first alignment signal
96 second alignment unit
97 second alignment signal
DF first direction of support element
DF' auxiliary first direction of auxiliary support element
DS second direction of support element
DT third direction of support element
DPB primary direction of belt
DPB' auxiliary primary direction of auxiliary belt
DSB secondary direction of belt
DTB tertiary direction of belt 200 method
202 providing pre-shaped element
204 positioning engagement part in first position
205 collecting pre-shaped element
206 moving support element in first direction
206a extending support element
206b moving arm to move the engagement part
208 moving belt in primary direction
210 stopping movement of support element and belt
212 moving apparatus
214 positioning engagement part in second position
215 releasing pre-shaped element
216 moving support element in second direction
216a retracting support element
216b moving arm to move the engagement part
218 moving belt in secondary direction
220 stopping movement of support element and belt

The invention claimed is:

1. A method for manufacturing at least a part of a wind turbine blade, the method comprising the use of an apparatus comprising an engagement part, the engagement part comprising:
 a support element having a first support edge,
 a belt extending around the support element and forming a primary engagement edge of the engagement part along the first support edge of the support element,
the method comprising:
 providing one or more pre-shaped elements, including a first pre-shaped element, in a first element position,
 positioning the engagement part in a first position,
 moving the support element in a first direction with a first velocity to extend underneath the first pre-shaped element,
 while moving the support element in a first direction with a first velocity, moving the belt relative to the support element around the first support edge in a primary direction from below the first support edge to above the first support edge with a primary velocity, wherein the first velocity and the primary velocity are the same,
 positioning the engagement part in a second position, wherein the engagement part in the second position is arranged above a blade shell part,
 releasing the pre-shaped element.

2. Method according to claim 1, wherein releasing the pre-shaped element from the belt comprises:
 moving the support element in a second direction with a second velocity,
 while moving the support element in the second direction with the second velocity, moving the belt relative to the support element around the first support edge in a secondary direction from above the first support edge to below the first support edge with a secondary velocity, wherein the second velocity and the secondary velocity are the same.

3. Method according to claim 1, wherein the pre-shaped element is aligned with a blade shell part in a second element position.

4. Method according to claim 1, wherein the engagement part comprises a main body and wherein moving the support element in the first direction comprises extending the support element relative to the main body such that the support element protrudes to a protruded position relative to the main body.

5. Method according to claim 1, wherein the engagement part comprises a main body and wherein moving the support element in the second direction comprises retracting the support element relative to the main body such that the support element retracts to a retracted position relative to the main body.

6. Method according to claim 1, wherein the belt is fixed relative to a main body at a primary end and/or at a secondary end.

7. Method according to claim 1, wherein the belt forms a closed loop around the support element.

8. Method according to claim 1, wherein the apparatus comprises an arm supporting the engagement part, wherein positioning the engagement part in the first position comprises arranging the arm in a first configuration.

9. Method according to claim 8, wherein positioning the engagement part in the second position comprises arranging the arm in a second configuration.

10. Method according to claim 8, wherein moving the support element in the first direction or a second direction comprises rearranging the arm to move the engagement part.

11. Method according to claim 8 comprising moving the apparatus by sliding the apparatus on a track relative to a mould for a blade shell part of a wind turbine blade.

12. Method according to claim 8, wherein providing the one or more pre-shaped elements comprises providing a rack with the one or more pre-shaped elements.

13. Method according to claim 8, wherein the apparatus comprises an alignment unit, and wherein positioning the engagement part in the first position is based on input from the alignment unit and/or wherein positioning the engagement part in the second position is based on input from the alignment unit.

14. Method according to claim 8, wherein the apparatus comprises a plurality of engagement parts including the engagement part and an auxiliary engagement part, wherein the engagement part and the auxiliary engagement part are spaced apart and wherein the pre-shaped element is collected by the engagement part and the auxiliary engagement part.

15. Method according to claim 14 wherein the engagement part and the auxiliary engagement part extend serially in the longitudinal direction, and wherein the support element of the engagement part may move in the first direction until the belt supports at least a first part of the pre-shaped element and an auxiliary support element of the auxiliary engagement part may move in an auxiliary first direction until the belt supports at least a second part of the pre-shaped element.

* * * * *